(12) United States Patent
Zhang

(10) Patent No.: US 11,503,032 B2
(45) Date of Patent: Nov. 15, 2022

(54) METHOD AND APPARATUS FOR DETECTING INVALIDITY OF ACCESS CONTROL LIST ACL RULE

(71) Applicant: HUAWEI TECHNOLOGIES CO., LTD., Guangdong (CN)

(72) Inventor: Yongping Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 43 days.

(21) Appl. No.: 17/186,209

(22) Filed: Feb. 26, 2021

(65) Prior Publication Data

US 2021/0273942 A1    Sep. 2, 2021

(30) Foreign Application Priority Data

Feb. 28, 2020  (CN) .......................... 202010129353.7

(51) Int. Cl.
*H04L 9/40*  (2022.01)
(52) U.S. Cl.
CPC .......... *H04L 63/101* (2013.01); *H04L 63/104* (2013.01); *H04L 63/108* (2013.01); *H04L 63/20* (2013.01)
(58) Field of Classification Search
CPC .................................................... H04L 63/101
See application file for complete search history.

(56) References Cited

U.S. PATENT DOCUMENTS

| 8,478,707 | B1* | 7/2013 | Ong | .................. | H04L 45/54 |
| | | | | | 709/215 |
| 2021/0273942 | A1* | 9/2021 | Zhang | ..................... | H04L 63/20 |

FOREIGN PATENT DOCUMENTS

| CN | 101662425 | A | * | 3/2010 | ............. | H04L 12/56 |
| CN | 101981887 | A | * | 2/2011 | ....... | H04L 29/08846 |
| CN | 104901958 | A | | 9/2015 | | |
| CN | 105335307 | A | | 2/2016 | | |
| CN | 106034054 | A | | 10/2016 | | |
| CN | 106549793 | A | | 3/2017 | | |
| CN | 109302409 | A | | 2/2019 | | |
| CN | 110768934 | A | | 2/2020 | | |

OTHER PUBLICATIONS

Saadaoui Amina et al: "FARE: FDD-based firewall anomalies resolution tool", Journal of Computational Science, Elsevier, Amsterdam, NL, vol. 23, Sep. 14, 2017(Sep. 14, 2017), total 11 pages.

* cited by examiner

*Primary Examiner* — Ponnoreay Pich
(74) *Attorney, Agent, or Firm* — Womble Bond Dickinson (US) LLP

(57) ABSTRACT

This application discloses a method and an apparatus for detecting invalidity of an ACL rule. The method includes: obtaining, by a first network entity, a second ACL rule, where the first network entity includes a first entry, and the first entry includes a first rule index and first information; generating, by the first network entity, a second entry according to the second ACL rule, where the second entry includes a second rule index and second information; determining, by the first network entity, whether the second information is a subset of the first information; and if the first network entity determines that the second information is a subset of the first information, determining, by the first network entity, that the second ACL rule is an invalid ACL rule, and skipping, by the first network entity, sending the second ACL rule to a second network entity.

18 Claims, 6 Drawing Sheets

METHOD AND APPARATUS FOR DETECTING INVALIDITY OF ACCESS CONTROL LIST ACL RULE

CROSS-REFERENCE TO RELATED APPLICATIONS

This application claims priority to Chinese Patent Application No. 202010129353.7, filed on Feb. 28, 2020, which is hereby incorporated by reference in its entirety.

TECHNICAL FIELD

This application relates to the network communications field, and in particular, to a method and an apparatus for detecting invalidity of an ACL rule.

BACKGROUND

Currently, in the industry, a method of an access control list (ACL) rule file is usually used to ensure security of network resources. A process thereof specifically includes: configuring a series of ACL rule files for network resources to identify packet features that need to be filtered, so as to specify a user's operation permission for the network resources; applying the ACL rule files to a communications device port, so that only an authorized user can operate the network resources; distinguishing between traffic types or users, and performing different quality of service (QoS) behaviors for different traffic types or users; and filtering traffic, and providing protection against viruses or attacks.

Currently, a quantity of ACL rules deployed on a network device is increasing, and the ACL rules become increasingly complex. During deployment of the ACL rules, invalid ACL rules are very likely to be deployed on the network device, thereby causing a waste of resources. In addition, after the ACL rules are deployed on the network device, with a change of a network topology and a business requirement, new ACL rules may be continuously added to an ACL rule list. In this case, a comparatively large quantity of invalid ACL rules are generated in the ACL rule list.

Therefore, currently, before ACL rules are deployed on a network device, invalid ACL rules need to be manually identified. However, currently, a comparatively large quantity of ACL rules are deployed on a network device, and manual identification of invalid ACL rules takes a long time and is prone to errors. Before each deployment, invalid ACL rules need to be manually identified again, thereby causing very high labor and time costs.

SUMMARY

A first aspect of this application provides a method for detecting invalidity of an ACL rule. A first network entity obtains a second ACL rule, where the first network entity includes a first entry, the first entry includes a first rule index and first information, the first rule index is used to indicate a first ACL rule, the first information is information extracted by the first network entity from the first ACL rule, and the first ACL rule is a valid ACL rule. The first network entity generates a second entry according to the second ACL rule, where the second entry includes a second rule index and second information, the second rule index is used to indicate the second ACL rule, the second information is information extracted by the first network entity from the second ACL rule, and the second information has a same attribute as that of the first information. The first network entity determines whether the second information is a subset of the first information. If the first network entity determines that the second information is a subset of the first information, the first network entity determines that the second ACL rule is an invalid ACL rule, and the first network entity skips sending the second ACL rule to a second network entity. In this way, before an ACL rule is deployed on the second network entity, the first network entity can detect an invalid ACL rule, and does not send the invalid rule to the second network entity, so that hardware resources of the second network entity can be saved, and the invalid ACL rule does not need to be manually identified, so that manual maintenance costs can be reduced.

In an embodiment, if the first network entity determines that the second information is not a subset of the first information, the first network entity determines that the second ACL rule is a valid ACL rule, and the first network entity sends the second ACL rule to the second network entity. After determining that an ACL rule is a valid ACL rule, the first network entity may send the valid ACL rule to the second network entity, to ensure that a valid ACL rule is deployed on the second network entity.

In an embodiment, the first network entity includes an ACL rule element table, the ACL rule element table includes the first entry and the second entry, and after the first network entity determines that the second ACL rule is an invalid ACL rule, the method further includes: The first network entity generates a user report based on the ACL rule element table. The user report includes the first ACL rule, the second ACL rule, and a parent-child relationship between the first ACL rule and the second ACL rule, and the first ACL rule is a parent rule of the second ACL rule. The user report can present an invalid ACL rule to an operator, to avoid deployment of the invalid ACL rule.

In an embodiment, the first network entity determines that a third ACL rule is a to-be-deleted ACL rule, where a third entry includes a third rule index and third information, the third information is extracted by the first network entity from the third ACL rule, the third rule index is used to indicate the third ACL rule, and the third ACL rule is a valid ACL rule; the first network entity determines whether a fourth entry is included after the third entry in the ACL rule element table, where the fourth entry includes a fourth rule index and fourth information, the fourth rule index indicates a fourth ACL rule, and the fourth information is a subset of the third information; and if the first network entity determines that the fourth entry is not included after the third entry in the ACL rule element table, the first network entity indicates the second network entity to delete the third ACL rule. When there is a deletion requirement, if the fourth entry is not included after the third entry, the first network entity may directly delete the third ACL rule, without detecting whether another ACL rule is valid.

In an embodiment, if the first network entity determines that the fourth entry is included after the third entry in the ACL rule element table, the first network entity determines whether a fifth entry exists between the third entry and the fourth entry in the ACL rule element table, where the fifth entry includes a fifth rule index and fifth information, the fifth rule index indicates a fifth ACL rule, and the fourth information is a subset of the fifth information; when the first network entity determines that the fifth entry does not exist between the third entry and the fourth entry in the ACL rule element table, the first network entity sends the fourth ACL rule to the second network entity; and the first network entity indicates the second network entity to delete the third ACL rule.

In an embodiment, when the first network entity determines that the fifth entry exists between the third entry and the fourth entry in the ACL rule element table, the first network entity indicates the second network entity to delete the third ACL rule.

A second aspect of this application provides a first network entity. The first network entity includes: an obtaining module, configured to obtain a second ACL rule, where the first network entity includes a first entry, the first entry includes a first rule index and first information, the first rule index is used to indicate a first ACL rule, the first information is information extracted by the obtaining module from the first ACL rule, and the first ACL rule is a valid ACL rule; a generation module, configured to generate a second entry according to the second ACL rule, where the second entry includes a second rule index and second information, the second rule index is used to indicate the second ACL rule, the second information is information extracted by the obtaining module from the second ACL rule, and the second information has a same attribute as that of the first information; and a processing module, configured to determine whether the second information is a subset of the first information, where the processing module is further configured to: when the processing module determines that the second information is a subset of the first information, determine that the second ACL rule is an invalid ACL rule, and indicate a sending module not to send the second ACL rule to a second network entity. In this way, before an ACL rule is deployed on the second network entity, the first network entity can detect an invalid ACL rule, and does not send the invalid rule to the second network entity, so that hardware resources of the second network entity can be saved, and the invalid ACL rule does not need to be manually identified, so that manual maintenance costs can be reduced.

In an embodiment, the processing module is further configured to: when the first network entity determines that the second information is not a subset of the first information, determine that the second ACL rule is a valid ACL rule; and the sending module is configured to send the second ACL rule to the second network entity.

In an embodiment, the first network entity includes an ACL rule element table, the ACL rule element table includes the first entry and the second entry, and the processing module is further configured to generate a user report based on the ACL rule element table. The user report includes the first ACL rule, the second ACL rule, and a parent-child relationship between the first ACL rule and the second ACL rule, and the first ACL rule is a parent rule of the second ACL rule. The user report can present an invalid ACL rule to an operator, to avoid deployment of the invalid ACL rule.

In an embodiment, the processing module is further configured to determine that a third ACL rule in the ACL rule element table is a to-be-deleted ACL rule, where a third entry includes a third rule index and third information, the third information is extracted by the first network entity from the third ACL rule, the third rule index is used to indicate the third ACL rule, and the third ACL rule is a valid ACL rule; the processing module is further configured to determine whether a fourth entry is included after the third entry in the ACL rule element table, where the fourth entry includes a fourth rule index and fourth information, the fourth rule index indicates a fourth ACL rule, and the fourth information is a subset of the third information; and the processing module is further configured to: when the first network entity determines that the fourth entry is not included after the third entry in the ACL rule element table, indicate the second network entity to delete the third ACL rule.

In an embodiment, the processing module is further configured to: when the fourth entry is included after the third entry, determine whether a fifth entry exists between the third entry and the fourth entry in the ACL rule element table, where the fifth entry includes a fifth rule index and fifth information, the fifth rule index indicates a fifth ACL rule, and the fourth information is a subset of the fifth information; the processing module is further configured to: when the processing module determines that the fifth entry does not exist between the third entry and the fourth entry in the ACL rule element table, send the fourth ACL rule to the second network entity; and the processing module indicates the second network entity to delete the third ACL rule.

In an embodiment, the processing module is further configured to: when the first network entity determines that the fifth entry exists between the third entry and the fourth entry in the ACL rule element table, indicate the second network entity to delete the third ACL rule.

A third aspect of this application provides a first network entity. The first network entity includes a control board and a forwarding board. The control board is configured to obtain a second ACL rule, where the first network entity includes a first entry, the first entry includes a first rule index and first information, the first rule index is used to indicate a first ACL rule, the first information is information extracted by the control board from the first ACL rule, and the first ACL rule is a valid ACL rule. The control board is further configured to generate a second entry according to the second ACL rule, where the second entry includes a second rule index and second information, the second rule index is used to indicate the second ACL rule, the second information is information extracted by the control board from the second ACL rule, and the second information has a same attribute as that of the first information. The control board is further configured to determine whether the second information is a subset of the first information. The control board is further configured to: when it is determined that the second information is a subset of the first information, determine that the second ACL rule is an invalid ACL rule, and indicate the forwarding board not to send the second ACL rule to a second network entity.

A fourth aspect of this application provides a first network entity. The first network entity includes a processor and an interface. The processor is configured to obtain a second ACL rule, where the first network entity includes a first entry, the first entry includes a first rule index and first information, the first rule index is used to indicate a first ACL rule, the first information is information extracted by the processor from the first ACL rule, and the first ACL rule is a valid ACL rule. The processor is further configured to generate a second entry according to the second ACL rule, where the second entry includes a second rule index and second information, the second rule index is used to indicate the second ACL rule, the second information is information extracted by the processor from the second ACL rule, and the second information has a same attribute as that of the first information. The processor is further configured to determine whether the second information is a subset of the first information. The processor is further configured to: when it is determined that the second information is a subset of the first information, determine that the second ACL rule is an invalid ACL rule, and indicate the interface not to send the second ACL rule to a second network entity.

A fifth aspect of this application provides a computer storage medium, configured to store a program, code, or an instruction that is used by the foregoing first network entity. When a processor or a hardware device executes the program, the code, or the instruction, the functions or the operations of the first network entity in the first aspect to the fourth aspect may be performed.

This application provides a method for detecting invalidity of an ACL rule. A first network entity obtains a second ACL rule, where the first network entity includes a first entry, the first entry includes a first rule index and first information, the first rule index is used to indicate a first ACL rule, the first information is information extracted by the first network entity from the first ACL rule, and the first ACL rule is a valid ACL rule. The first network entity generates a second entry according to the second ACL rule, where the second entry includes a second rule index and second information, the second rule index is used to indicate the second ACL rule, the second information is information extracted by the first network entity from the second ACL rule, and the second information has a same attribute as that of the first information. The first network entity determines whether the second information is a subset of the first information. If the first network entity determines that the second information is a subset of the first information, the first network entity determines that the second ACL rule is an invalid ACL rule, and the first network entity skips sending the second ACL rule to a second network entity. In this way, before an ACL rule is deployed on the second network entity, the first network entity can detect an invalid ACL rule, and does not send the invalid rule to the second network entity, so that hardware resources of the second network entity can be saved, and the invalid ACL rule does not need to be manually identified, so that manual maintenance costs can be reduced.

DESCRIPTION OF EMBODIMENTS

Figure 1:
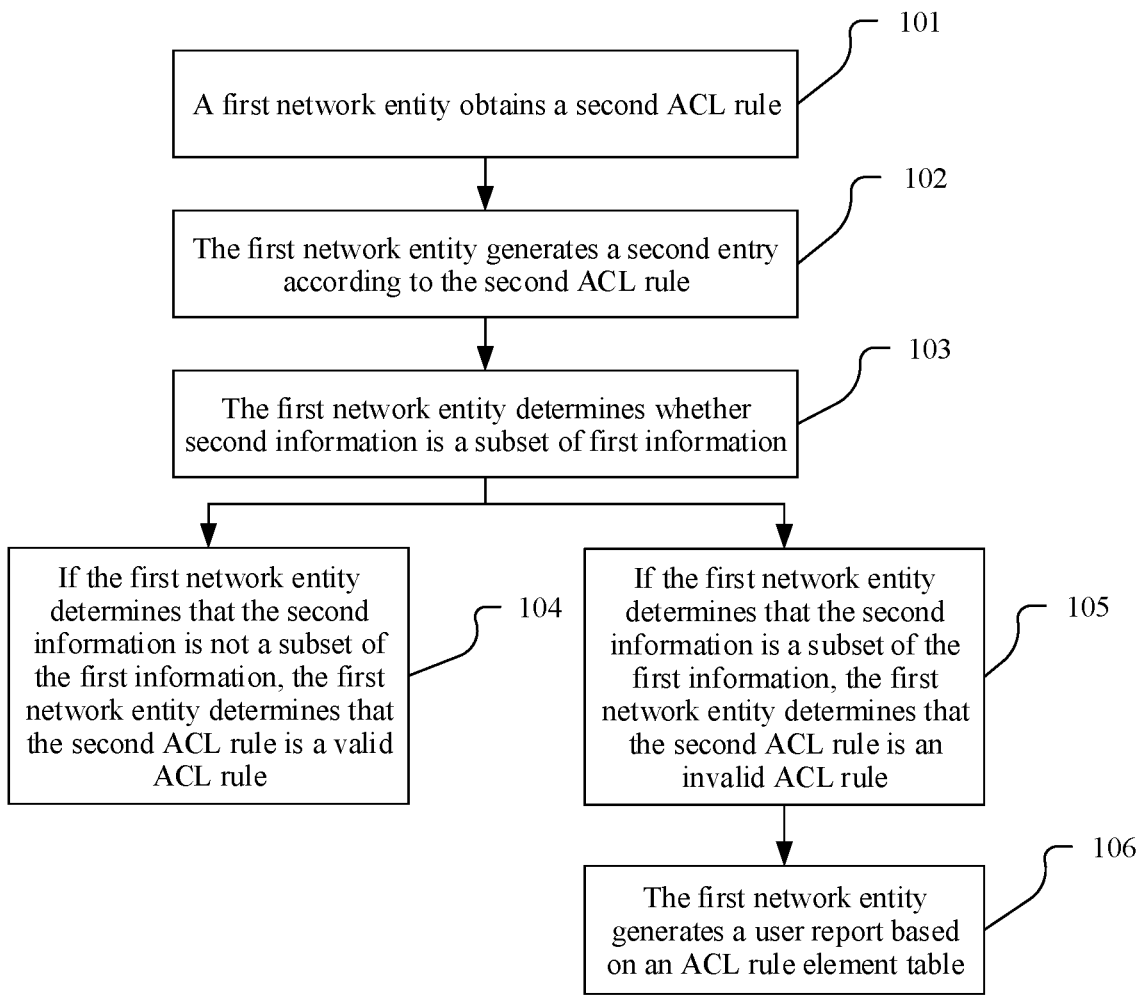
FIG. 1 is a schematic diagram of a method for detecting invalidity of an ACL rule according to this application.

The following clearly describes the technical solutions in the embodiments of this application with reference to the accompanying drawings in the embodiments of this application. Apparently, the described embodiments are merely some but not all of the embodiments of this application. All other embodiments obtained by a person skilled in the art based on the embodiments of this application without creative efforts shall fall within the protection scope of this application.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of operations or modules is not necessarily limited to those modules, but may include other modules not expressly listed or inherent to such a process, method, system, product, or device.

With rapid development of network communications technologies, how to protect network resources against unauthorized operations has also attracted increasing attention in the industry. In the industry, a method of configuring an ACL rule file is usually used to ensure security of network resources. However, if an ACL rule a and an ACL rule b are configured in a section of an ACL rule list, the ACL rule a is arranged before the ACL rule b, and information included in the ACL rule b is a subset of information included in the ACL rule a, it can be considered that the ACL rule b is invalid. The ACL rule a is a parent rule of the ACL rule b, and the ACL rule b is a child rule of the ACL rule a. Because content of the ACL rule b is covered by content of the ACL rule a, deploying the ACL rule b after the ACL rule a is deployed does not make sense, but occupies hardware resources of a network entity, thereby causing a waste of resources.

Therefore, before ACL rules are deployed, the to-be-deployed ACL rules may be first filtered to avoid deployment of an invalid ACL rule. It should be noted that a network device A may filter ACL rules and deliver a valid ACL rule to a network device B, where the network device A and the network device B are different network devices; or a module A of a network device may filter ACL rules, and then the module A of the network device sends a valid ACL rule to a module B of the same network device.

In an embodiment, a network management device may perform validity detection on ACL rules, the network management device distinguishes between a valid ACL rule and an invalid ACL rule, then the network management device sends the valid ACL rule to a managed device, and the managed device deploys the valid ACL rule; or invalidity detection may be performed on a control board of a network device, and the control board filters out an invalid ACL rule, and then sends a valid ACL rule to a forwarding board of the network device, where the network device may be a router; or a processor, such as a central processing unit (CPU), in a network device performs validity detection, and then the CPU sends a valid ACL rule to an interface of the same network device.

A first embodiment of this application provides a method for detecting invalidity of an ACL rule. Referring to FIG. 1, the method includes the following operations.

101. A first network entity obtains a second ACL rule.

The first network entity obtains the second ACL rule. It should be noted that the first network entity may be an independent device, or may be a module in an independent device. Operation 101 may be a scenario in which an ACL is delivered as a whole, or may be a scenario in which an ACL rule is added. In an embodiment, in the scenario in which the ACL is delivered as a whole, the first network entity may obtain the second ACL rule from the ACL; or in the scenario in which an ACL rule is added, the first network entity may directly receive the second ACL rule entered by a user.

In the scenario in which the ACL is delivered as a whole, the first network entity successively detects whether each ACL rule in the ACL is valid. For example, it is assumed that an ACL 1 includes the following three ACL rules:

Rule 1 source-ip 1.1.1.1 mask 24 destination-ip 10.10.10.10 mask 24.

Rule 2 source-ip 2.2.2.2 mask 24 destination-ip 10.10.10.10 mask 24.

Rule 3 source-ip 1.1.1.1 mask 32 destination-ip 10.10.10.10 mask 24.

where source-ip is a source IP address, mask is a mask, and destination-ip is a destination IP address.

It should be noted that a mask of a source IP address of the Rule 1 is 24, indicating that first three bits of the source IP address are network bits. A $4^{th}$ bit of the source IP address is X, indicating that the $4^{th}$ bit of the source IP address may be any value. An IP address whose first three bits are the same as those of the source IP address and whose $4^{th}$ bit is different from that of the source IP address is a subset of the source IP address. Similarly, a mask of a destination IP address of the Rule 1 is also 24, and a $4^{th}$ bit of the destination IP address is also X, indicating that the $4^{th}$ bit of the destination IP address may be any value. If a mask of a source IP address is 32, it indicates that first four bits of the source IP address are all network bits, and an IP address whose four bits are the same as those of the source IP address is a subset of the source IP address. Similarly, if a mask of a destination IP address is 32, it indicates that first four bits of the destination IP address are all network bits, and an IP address whose four bits are the same as those of the destination IP address is a subset of the destination IP address.

Before the ACL is delivered as a whole, because the first network entity has not recorded an ACL rule, the first network entity directly stores the Rule 1 on the first network entity after obtaining the Rule 1 from the ACL 1. The Rule 1 is a valid ACL rule. The first network entity extracts information corresponding to the Rule 1 from the Rule 1.

The information corresponding to the Rule 1 may include one or more of all network information that may be included in the Rule 1. All the network information that may be included in the Rule 1 may include a source IP address, a destination IP address, a source port number, a destination port number, a protocol number, and the like. In this application, an example in which the information corresponding to the Rule 1 includes the source IP address and the destination IP address is used, but should not be construed as a limitation on this application.

The information that corresponds to the Rule 1 and that is extracted by the first network entity from the Rule 1 may include a source IP address of 1.1.1.X and a destination IP address of 10.10.10.X. The first network entity stores the extracted information on the first network entity.

It should be noted that the first network entity may store the information extracted from the ACL rule in an ACL rule element table, and the ACL rule element table may record, by using a field, whether the ACL rule is valid; or the first network entity may store a valid ACL rule in a storage region, and store an invalid ACL rule in another storage region. This is not limited herein. In this application, an example in which the first network entity records the information extracted from the Rule 1 in an entry of the ACL rule element table is used. As shown in the following table, the ACL rule element table may include a rule index field, a valid or not field, a source IP address field, a destination IP address field, and a parent rule field.

| Rule index | Valid or not | Source IP address | Destination IP address | Parent rule |
|---|---|---|---|---|
| ACL 1/Rule 1 | 1 | 1.1.1.X | 10.10.10.X | |

In the entry, the "rule index" field is "ACL 1/Rule 1", indicating that the entry indicates the Rule 1 in the ACL 1. The "valid or not" field may be "1", indicating that the Rule 1 corresponding to the entry is a valid ACL rule. The "source IP address" field is the source IP address extracted from the Rule 1, and the "destination IP address" field is the destination IP address extracted from the Rule 1. If the "valid or not" field is "0", it indicates that an ACL rule corresponding to the entry is an invalid ACL rule. A parent rule of the ACL rule corresponding to the entry may be recorded in the "parent rule" field.

After the first network entity records the entry corresponding to the Rule 1 in the ACL rule element table, the first network entity may send the Rule 1 to a second network entity.

When detecting whether the Rule 2 in the ACL 1 is valid, because the ACL rule element table already includes the entry corresponding to the Rule 1, the first network entity detects whether the Rule 2 is a child rule of the Rule 1.

In an embodiment, during validity detection of the Rule 2, the Rule 1 may be used as a first ACL rule. The entry, in the ACL rule element table, that corresponds to the Rule 1 is a first entry. "ACL 1/Rule 1" in the first entry is a first rule index. The first rule index is used to indicate the first ACL rule. First information includes the source IP address and the destination IP address of the Rule 1. The first information is the information extracted by the first network entity from the Rule 1. The Rule 1 is a valid ACL rule.

The first network entity obtains the Rule 2 from the ACL 1 as a second ACL rule.

The first network entity extracts second information from the Rule 2. The second information includes a source IP address of 2.2.2.X and a destination IP address of 10.10.10.X that are included in the Rule 2. Like the information corresponding to the Rule 1, the second information may include one or more of all network information that may be included in the Rule 2. All the network information that may be included in the Rule 2 may include the source IP address, the destination IP address, a source port number, a destination port number, a protocol number, and the like. In this application, an example in which the second information includes the source IP address and the destination IP address in the Rule 2 is used, but should not be construed as a limitation on this application.

102. The first network entity generates a second entry according to the second ACL rule.

The first network entity generates the second entry according to the Rule 2. The second entry includes a second rule index and the second information. The second rule index is ACL 1/Rule 2, and the second rule index is used to indicate the Rule 2. The second information includes the source IP address of 2.2.2.X and the destination IP address of 10.10.10.X that are in the Rule 2.

The second information has a same attribute as that of the first information. In an embodiment, the second information includes the same items as those included in the first information. It should be noted that, if a quantity of items included in the first information is different from a quantity of items included in the second information, it is considered that a missing item is empty. Any corresponding item may be considered as a subset of the empty item. For example, if the second information includes two items of the source IP address and the destination IP address, and the first information includes only one item of the source IP address, it is considered that the destination IP address included in the first information is empty. Regardless of what the destination IP address included in the second information is, the destination IP address in the second information is a subset of the destination IP address in the first information. If the source IP address in the second information is a subset of the source IP address in the first information, the second information is a subset of the first information.

103. The first network entity determines whether the second information is a subset of the first information.

The first network entity determines whether the second information is a subset of the first information. In an embodiment, the first network entity compares each item in the second information with a corresponding item in the first information. If each item in the second information is a subset of the corresponding item in the first information, the first network entity determines that the second information is a subset of the first information; or if an item in the second information is not a subset of a corresponding item in the first information, the first network entity determines that the second information is not a subset of the first information.

The first network entity compares the source IP address (2.2.2.X) included in the second information with the source IP address (1.1.1.X) included in the first information. Then the first network entity may determine that the source IP address in the second information is not a subset of the source IP address in the first information. The first network entity compares the destination IP address (10.10.10.X) included in the second information with the destination IP address (10.10.10.X) included in the first information. The destination IP address in the second information is the same as the destination IP address in the first information, and the destination IP address in the second information is a subset of the destination IP address in the first information.

Because the source IP address in the second information is not a subset of the source IP address in the first information, the first network entity determines that the second information is not a subset of the first information.

104. If the first network entity determines that the second information is not a subset of the first information, the first network entity determines that the second ACL rule is a valid ACL rule.

Because the first network entity determines that the second information is not a subset of the first information, the first network entity determines that the second ACL rule is a valid ACL rule.

After determining that the second ACL rule (the Rule 2) is a valid ACL rule, the first network entity records the second rule index and the second information in the ACL rule element

| Rule index | Valid or not | Source IP address | Destination IP address | Parent rule |
|---|---|---|---|---|
| ACL 1/Rule 1 | 1 | 1.1.1.X | 10.10.10.X | |
| ACL 1/Rule 2 | 1 | 2.2.2.X | 10.10.10.X | |

A "rule index" included in the entry corresponding to the Rule 2 is ACL 1/Rule 2, which may indicate the Rule 2 in the ACL 1. "Valid or not" in the second entry is 1. In the second entry, a "source IP address" is 2.2.2.2, and a "destination IP address" is 10.10.10.X.

The first network entity may send the Rule 2 to the second network entity, and the second network entity deploys the Rule 2.

105. If the first network entity determines that the second information is a subset of the first information, the first network entity determines that the second ACL rule is an invalid ACL rule.

It is assumed that the ACL rule element table includes n valid entries, each valid entry indicates a valid ACL rule, and n is a positive integer. When the first network entity detects whether an $m^{th}$ ACL rule is valid, the first network entity first extracts $m^{th}$ information from the $m^{th}$ ACL rule, and then traverses the n valid entries, and successively compares the $m^{th}$ information with information included in each of then valid entries. If a $k^{th}$ entry exists in then valid entries, the $k^{th}$ entry includes $k^{th}$ information, and the $m^{th}$ information is a subset of the $k^{th}$ information, the first network entity determines that the $m^{th}$ ACL rule is an invalid ACL rule, and the first network entity may stop after performing traversal until the $k^{th}$ entry, where k is a positive integer. If the $k^{th}$ entry does not exist in the n valid entries, the $m^{th}$ ACL rule is a valid ACL rule.

For example, when detecting whether the Rule 3 is valid, because the ACL rule element table already includes a valid entry, the first network entity detects whether the Rule 3 is a child rule of the Rule 1. If the Rule 3 is a child rule of the Rule 1, it may be determined that the Rule 3 is invalid, and there is no need to detect whether the Rule 3 is a child rule of the Rule 2. If the Rule 3 is not a child rule of the Rule 1, it is further detected whether the Rule 3 is a child rule of the Rule 2. If the Rule 3 is a child rule of the Rule 2, it is determined that the Rule 3 is invalid. If the Rule 3 is not a child rule of the Rule 2, it is determined that the Rule 3 is valid.

In an embodiment, the Rule 3 is used as a second ACL rule, and a second entry is generated according to the Rule 3. The second entry includes a second rule index (ACL 1/Rule 3) and second information. The second information includes a source IP address (1.1.1.1) and a destination IP address (10.10.10.X) in the Rule 3.

It is determined that the Rule 1 is a first ACL rule, the Rule 1 includes first information, and the first information includes the source IP address (1.1.1.X) and the destination IP address (10.10.10.X) in the Rule 1. The first network entity compares the source IP address (1.1.1.1) in the second information with the source IP address (1.1.1.X) in the first information, and determines that the source IP address in the second information is a subset of the source IP address in the first information. The first network entity compares the destination IP address (10.10.10.X) in the second information with the destination IP address (10.10.10.X) in the first information, and determines that the destination IP address in the second information is the same as the destination IP address in the first information, and the destination IP address in the second information is a subset of the destination IP address in the first information. Therefore, each item in the second information is a subset of a corresponding item in the first information, and the second information is a subset of the first information. Therefore, the Rule 1 is a parent rule of the Rule 3. The first network entity determines that the Rule 3 is an invalid ACL rule. The first network entity does not send the Rule 3 to the second network entity.

The first network entity records the second entry (that is, an entry corresponding to the Rule 3) in the ACL rule element table. In this case, the ACL rule element table is as follows:

| Rule index | Valid or not | Source IP address | Destination IP address | Parent rule |
|---|---|---|---|---|
| ACL 1/Rule 1 | 1 | 1.1.1.X | 10.10.10.X | |
| ACL 1/Rule 2 | 1 | 2.2.2.X | 10.10.10.X | |
| ACL 1/Rule 3 | 0 | 1.1.1.1 | 10.10.10.X | ACL 1/Rule 1 |

A "second index" included in the entry corresponding to the Rule 3 is ACL 1/Rule 3, which may indicate the Rule 3 in the ACL 1. Because the Rule 3 is a child rule of the Rule 1, the Rule 3 is invalid, and "valid or not" in the second entry is 0. A "parent rule" in the second entry is ACL 1/Rule 1, which may indicate that a parent rule of the Rule 3 in the ACL 1 is the Rule 1 in the ACL 1. In the second entry, a "source IP address" is 1.1.1.1, and a "destination IP address" is 10.10.10.X.

106. The first network entity generates a user report based on the ACL rule element table.

The first network entity generates the user report based on the ACL rule element table. The user report includes an invalid ACL rule and a parent rule of the invalid ACL rule. For example, the user report may include content of the Rule 3, content of the Rule 1, and a parent-child relationship between the Rule 1 and the Rule 3.

In the foregoing embodiment, the scenario in which the ACL is delivered as a whole is used as an example. After the ACL is delivered as a whole, an ACL rule may be further added. After the ACL is delivered as a whole, the first network entity detects whether a newly added ACL rule is valid. In an embodiment, the first network entity traverses entries in the ACL rule element table to detect whether a parent rule of the newly added ACL rule exists. If a parent rule exists, the newly added ACL rule is an invalid ACL rule; or if no parent rule exists, the newly added ACL rule is a valid ACL rule.

For example, after the ACL 1 is delivered as a whole, a Rule 4 is added to the ACL 1. The Rule 4 is as follows:

Rule 4 source-ip 2.2.2.2 mask 24 destination-ip 10.10.10.10 mask 24.

The first network entity may use the Rule 4 as a second ACL rule, and generate a second entry according to the Rule 4. The second entry includes second rule index (ACL 1/Rule 4), and second information includes a source IP address (2.2.2.X) and a destination IP address (10.10.10.X) in the Rule 4.

It is determined that the Rule 1 is a first ACL rule, the Rule 1 includes first information, and the first information includes the source IP address (1.1.1.X) and the destination IP address (10.10.10.X) in the Rule 1. The first network entity compares the source IP address (2.2.2.X) in the second information with the source IP address (1.1.1.X) in the first information, and determines that the source IP address in the second information is not a subset of the source IP address in the first information; and compares the destination IP address (10.10.10.X) in the second information with the destination IP address (10.10.10.X) in the first information, and determines that the destination IP address in the second information is the same as the destination IP address in the first information, and the destination IP address in the second information is a subset of the destination IP address in the first information. Because the source IP address in the second information is not a subset of the source IP address in the first information, the first network entity may determine that the second ACL rule is not a child rule of the first ACL rule, that is, the Rule 4 is not a child rule of the Rule 1.

It should be noted that the first ACL rule may be an ACL rule corresponding to any entry stored in the ACL rule element table of the first network entity. If the Rule 4 is not a child rule of the Rule 1, the first network entity may continue to use the Rule 2 as a first ACL rule. The Rule 2 includes first information, and the first information includes the source IP address (2.2.2.X) and the destination IP address (10.10.10.X) in the Rule 2. The first network entity compares the source IP address (2.2.2.X) in the second information with the source IP address (2.2.2.X) in the first information, and determines that the source IP address in the second information is the same as the source IP address in the first information, and the source IP address in the second information is a subset of the source IP address in the first information; and compares the destination IP address (10.10.10.X) in the second information with the destination IP address (10.10.10.X) in the first information, and determines that the destination IP address in the second information is the same as the destination IP address in the first information, and the destination IP address in the second information is a subset of the destination IP address in the first information. The source IP address in the second information is a subset of the source IP address in the first information, and the destination IP address in the second information is a subset of the destination IP address in the first information. Therefore, the second information is a subset of the first information, and the second ACL rule is a child rule of the first ACL rule, that is, the Rule 4 is a child rule of the Rule 2. The Rule 4 is an invalid ACL rule. The first network entity does not send the Rule 4 to the second network entity.

The first network entity records an entry corresponding to the Rule 4 in the ACL rule element table. In this case, the ACL rule element table is as follows:

| Rule index | Valid or not | Source IP address | Destination IP address | Parent rule |
|---|---|---|---|---|
| ACL 1/Rule 1 | 1 | 1.1.1.X | 10.10.10.X | |
| ACL 1/Rule 2 | 1 | 2.2.2.X | 10.10.10.X | |
| ACL 1/Rule 3 | 0 | 1.1.1.1 | 10.10.10.X | ACL 1/Rule 1 |
| ACL 1/Rule 4 | 0 | 2.2.2.X | 10.10.10.X | ACL 1/Rule 2 |

A "second index" included in the entry corresponding to the Rule 4 is ACL 1/Rule 4, which may indicate the Rule 4 in the ACL 1. Because the Rule 4 is a child rule of the Rule 2, the Rule 4 is invalid, and "valid or not" in the second entry is 0. A "parent rule" in the second entry is ACL 1/Rule 2, which may indicate that a parent rule of the Rule 4 in the ACL 1 is the Rule 2. In the second entry, a "source IP address" is 2.2.2.X, and a "destination IP address" is 10.10.10.X.

The first network entity may generate a user report based on the entry, in the ACL rule element table, that corresponds to the Rule 4. The user report may include content of the Rule 4, content of the Rule 2, and a parent-child relationship between the Rule 2 and the Rule 4.

It should be noted that, in the foregoing descriptions, that information extracted according to an ACL rule includes a source IP address and a destination IP address is merely used as an example. In actual implementation, the information extracted according to the ACL rule may include one or more of network information such as a source IP address, a destination IP address, a source port number, a destination port number, a protocol number, and the like. This is not limited herein. When detecting whether an ACL rule is valid, the first network entity compares the second information extracted from the second ACL rule with each item of information included in the first information included in the first network entity. If an item in the second information is not a subset of a corresponding item in the first information, the second information is not a subset of the first information. The second information is a subset of the first information only when each item in the second information is a subset of a corresponding item in the first information.

The first embodiment of this application provides a method for detecting invalidity of an ACL rule. With this method, the first network entity may detect an invalid ACL rule, and does not send the invalid rule to the second network entity, so that hardware resources of the second network entity can be saved, and the invalid ACL rule does not need to be manually identified, so that manual maintenance costs can be reduced.

Figure 2:
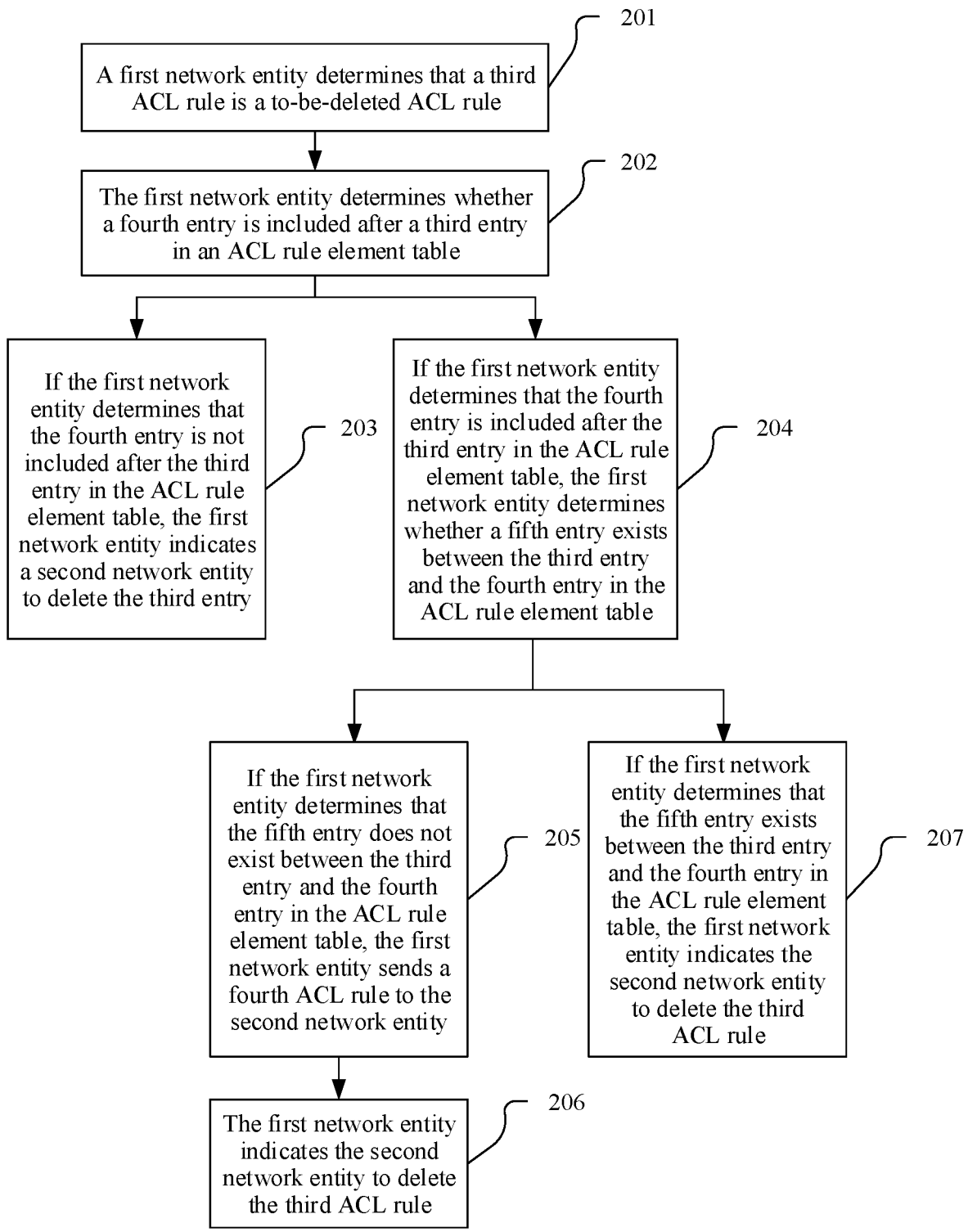
FIG. 2 is a schematic diagram of a method for deleting an ACL rule according to this application.

In actual services, in addition to the descriptions of delivering an ACL rule as a whole and adding an ACL rule in the foregoing embodiment, there is also a service of deleting an ACL rule. After an ACL rule is delivered as a whole, if there is a service requirement of deleting a specific ACL rule, the first network entity detects whether a child rule of the rule exists. If a child rule of the rule exists, the first network entity may re-detect whether the child rule is valid. For details, refer to FIG. 2. A second embodiment includes the following operations.

201. The first network entity determines that a third ACL rule is a to-be-deleted ACL rule.

The first network entity determines that the third ACL rule in an ACL rule element table is the to-be-deleted ACL rule. Referring to the following table, the ACL rule element table includes four entries, and the four entries respectively indicate four ACL rules in an ACL 2.

| Rule index | Valid or not | Source IP address | Destination IP address | Parent rule |
|---|---|---|---|---|
| ACL 2/Rule 1 | 1 | 1.1.1.X | 10.10.10.X | |
| ACL 2/Rule 2 | 1 | 2.2.2.X | 10.10.10.X | |
| ACL 2/Rule 3 | 0 | 1.1.1.1 | 10.10.10.X | ACL 2/Rule 1 |
| ACL 2/Rule 4 | 0 | 1.1.1.1 | 10.10.10.1 | ACL 2/Rule 1 |

For example, the first network entity determines that an ACL rule indicated by a $2^{nd}$ entry in the ACL rule element table is the third ACL rule, that is, the Rule 2 is the to-be-deleted ACL rule. The third ACL rule includes a third rule index (ACL 2/Rule 2) and third information. The third information includes a source IP address (2.2.2.X) and a destination IP address (10.10.10.X) that are included in the Rule 2. The third ACL rule is a valid ACL rule.

202. The first network entity determines whether a fourth entry is included after a third entry in the ACL rule element table.

After determining the to-be-deleted third ACL rule, the first network entity detects whether a child rule of the original third ACL rule is valid after the third ACL rule is deleted.

In an embodiment, the first network entity determines whether the fourth entry exists after the third entry in the ACL rule element table. The fourth entry includes a fourth rule index and fourth information. The fourth rule index indicates a fourth ACL rule. The fourth information is a subset of the third information.

203. If the first network entity determines that the fourth entry is not included after the third entry in the ACL rule element table, the first network entity indicates a second network entity to delete the third entry.

The first network entity determines that the fourth entry is not included after the third entry in the ACL rule element table. With reference to the example of operation 201, the first network entity determines that neither the Rule 3 nor the Rule 4 is a child rule of the Rule 2. In this case, the first network entity may directly indicate the second network entity to delete the $2^{nd}$ entry. In an embodiment, the first network entity may send indication information to the second network entity. The indication information includes the second entry, and the indication information may indicate the second network entity to delete the second entry.

204. If the first network entity determines that the fourth entry is included after the third entry in the ACL rule element table, the first network entity determines whether a fifth entry exists between the third entry and the fourth entry in the ACL rule element table.

If the first network entity determines that the fourth entry is included after the third entry in the ACL rule element table, the first network entity determines whether the fifth entry exists between the third entry and the fourth entry in the ACL rule element table. The fifth entry includes a fifth rule index and fifth information. The fifth rule index indicates a fifth ACL rule. The fourth information is a subset of the fifth information.

For example, in operation 201, the first network entity determines that the Rule 1 is a to-be-detected ACL rule, that is, a $1^{st}$ entry is the third entry; in this case, in operation 202, the first network entity may determine that a $3^{rd}$ entry in the ACL rule element table is the fourth entry. The fourth entry corresponds to the Rule 3, and the fourth information included in the fourth entry is a subset of the third information included in the third entry. The first network entity determines whether the fifth entry exists between the $1^{st}$ entry and the $3^{rd}$ entry.

205. If the first network entity determines that the fifth entry does not exist between the third entry and the fourth entry in the ACL rule element table, the first network entity sends the fourth ACL rule to the second network entity.

If the first network entity determines that the fifth entry does not exist between the third entry and the fourth entry in the ACL rule element table, the first network entity sends the fourth ACL rule to the second network entity, and indicates the second network entity to redeploy the fourth ACL rule. It should be noted that, it is originally determined that the fourth ACL rule is an invalid ACL rule; however, after the third ACL rule is deleted, the fourth ACL rule has no parent rule, and the first network entity may determine that the fourth ACL rule is a valid ACL rule.

In an embodiment, with reference to the example of operation 204, the first network entity determines that the fifth entry does not exist between the third entry and the fourth entry, so that the fourth information included in the fourth entry is a subset of the fifth information included in the fifth entry. An ACL rule corresponding to any entry that exists between the $1^{st}$ entry and the $3^{rd}$ entry is not a parent rule of the Rule 3. The first network entity may determine that the Rule 3 is a valid ACL rule, and the first network entity sends the Rule 3 to the second network entity. The second network entity may deploy the Rule 3.

206. The first network entity indicates the second network entity to delete the third ACL rule.

After detecting validity of all child rules of the third ACL rule, the first network entity may delete the entry corresponding to the third ACL rule from the ACL rule element table, and indicate the second network entity to delete the third ACL rule.

207. If the first network entity determines that the fifth entry exists between the third entry and the fourth entry in the ACL rule element table, the first network entity indicates the second network entity to delete the third ACL rule.

After determining the third entry, the first network entity determines that the fifth entry exists between the third entry and the fourth entry. The fifth entry includes the fifth rule index and the fifth information. The fifth rule index indicates the fifth ACL rule. The fourth information is a subset of the fifth information.

After the third entry is deleted, an ACL rule corresponding to the fourth entry is still an invalid ACL rule. The first network entity deletes only the third entry, and indicates the second network entity to delete the third ACL rule.

In an embodiment, the first network entity determines that the Rule 1 is a to-be-detected ACL rule, that is, a $1^{st}$ entry is the third entry; in this case, after detecting validity of the Rule 3, the first network entity continues to detect validity of the Rule 4. The first network entity determines that a $4^{th}$ entry in the ACL rule element table is the fourth entry. The fourth entry corresponds to the Rule 4, and the fourth information included in the fourth entry is a subset of the third information included in the third entry.

The first network entity may determine that the $3^{rd}$ entry exists between the $1^{st}$ entry and the $4^{th}$ entry, and the Rule 3 corresponding to the $3^{rd}$ entry is a parent rule of the Rule 4, that is, the first network entity determines that the fifth entry exists between the third entry and the fourth entry in the ACL rule element table. In this case, if the $1^{st}$ entry is deleted, the Rule 4 corresponding to the $4^{th}$ entry is still an invalid ACL rule. Therefore, the first network entity does not send the Rule 4 to the second network entity. The second network entity does not redeploy the Rule 4.

After detecting validity of all child rules of the third ACL rule, the first network entity may indicate the second network entity to delete the third ACL rule.

The second embodiment of this application provides a method for detecting invalidity of an ACL rule. After an ACL rule is delivered as a whole, if there is a service requirement of deleting a specific ACL rule, the first network entity detects whether a child rule of the rule exists. If a child rule of the rule exists, the first network entity may detect whether the child rule is valid. If the child rule is a valid ACL rule, the first network entity may send the child rule to the second network entity.

Figure 3:
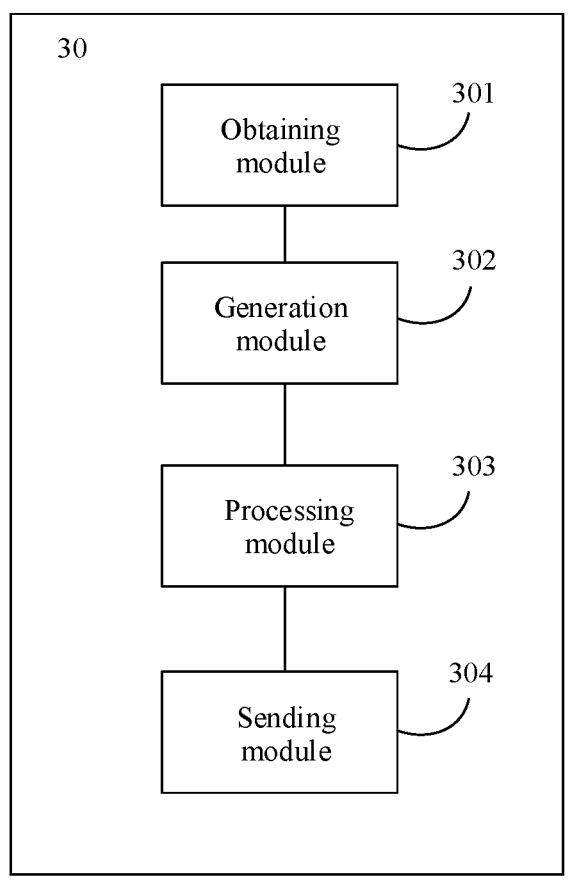
FIG. 3 is a schematic diagram of a first network entity for performing detection on an ACL rule according to this application.

FIG. 3 is a schematic structural diagram of a first network entity 30 according to an embodiment of this application. The first network entity shown in FIG. 3 may perform corresponding operations performed by the first network entity in the foregoing method embodiment. As shown in FIG. 3, the first network entity includes an obtaining module 301, a generation module 302, a processing module 303, and a sending module 304.

The obtaining module 301 is configured to obtain a second ACL rule. The first network entity 30 includes a first entry. The first entry includes a first rule index and first information. The first rule index is used to indicate a first ACL rule. The first information is information extracted by the obtaining module 301 from the first ACL rule. The first ACL rule is a valid ACL rule.

The generation module 302 is configured to generate a second entry according to the second ACL rule. The second entry includes a second rule index and second information. The second rule index is used to indicate the second ACL rule. The second information is information extracted by the obtaining module 301 from the second ACL rule. The second information has a same attribute as that of the first information.

The processing module 303 is configured to determine whether the second information is a subset of the first information.

The processing module 303 is further configured to: when the second information is a subset of the first information, determine that the second ACL rule is an invalid ACL rule, and indicate the sending module 304 not to send the second ACL rule to a second network entity.

The processing module 303 is further configured to: when the second information is not a subset of the first information, determine that the second ACL rule is a valid ACL rule; and the sending module 304 is configured to send the second ACL rule to the second network entity.

The processing module 303 is further configured to generate a user report based on an ACL rule element table. The user report includes the first ACL rule, the second ACL rule, and a parent-child relationship between the first ACL rule and the second ACL rule, and the first ACL rule is a parent rule of the second ACL rule.

The processing module 303 is further configured to determine that a third ACL rule is a to-be-deleted ACL rule. A third entry includes a third rule index and third information. The third information is extracted by the first network entity from the third ACL rule. The third rule index is used to indicate the third ACL rule. The third ACL rule is a valid ACL rule.

The processing module 303 is further configured to determine whether a fourth entry is included after the third entry in the ACL rule element table. The fourth entry includes a fourth rule index and fourth information. The fourth rule index indicates a fourth ACL rule. The fourth information is a subset of the third information.

The processing module 303 is further configured to: when the first network entity determines that the fourth entry is not included after the third entry in the ACL rule element table, indicate the second network entity to delete the third ACL rule.

The processing module 303 is further configured to: when the fourth entry is included after the third entry, determine whether a fifth entry exists between the third entry and the fourth entry in the ACL rule element table. The fifth entry includes a fifth rule index and fifth information. The fifth rule index indicates a fifth ACL rule. The fourth information is a subset of the fifth information.

The processing module 303 is further configured to: when the processing module determines that the fifth entry does not exist between the third entry and the fourth entry in the ACL rule element table, send the fourth ACL rule to the second network entity; and the processing module 303 is further configured to indicate the second network entity to delete the third ACL rule.

The processing module 303 is further configured to: when the first network entity determines that the fifth entry exists between the third entry and the fourth entry in the ACL rule element table, indicate the second network entity to delete the third ACL rule.

Figure 4:
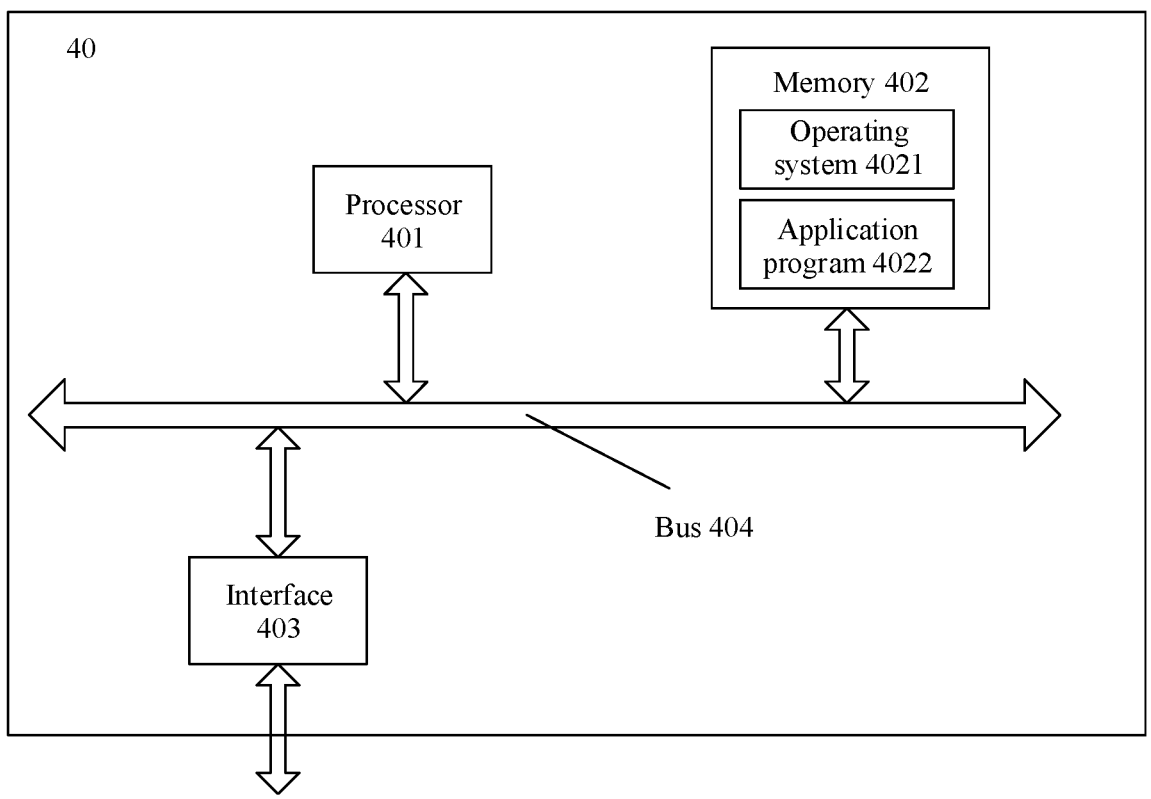
FIG. 4 is a schematic diagram of a first network entity for performing detection on an ACL rule according to this application.

FIG. 4 is a schematic diagram of a hardware structure of a first network entity 40 according to an embodiment of this application. The first network entity 40 shown in FIG. 4 may perform corresponding operations performed by the first network entity in the foregoing method embodiment.

As shown in FIG. 4, the first network entity 40 includes a processor 401, a memory 402, an interface 403, and a bus 404. The interface 403 may be implemented in a wired or wireless manner. In an embodiment, the interface 403 may be a network interface card. The processor 401, the memory 402, and the interface 403 are connected by using the bus 404.

The interface 403 may include a transmitter and a receiver, and is configured to send and receive information between the first network entity and the foregoing second network entity. For example, the interface 403 is configured to send a second ACL rule to the second network entity. The memory 402 includes an operating system 4021 and an application program 4022, and is configured to store a program, code, or an instruction. When the processor 401 or a hardware device executes the program, a processing process of the first network entity in the method embodiment may be performed. For example, the processor 401 may invoke the program in the memory 402 to obtain the second ACL rule, and may generate a second entry according to the ACL rule. The memory 402 may include a read-only memory (ROM) and a random access memory (RAM). The ROM includes a basic input/output system (BIOS) or an embedded system. The RAM includes an application program and an operating system. When the first network entity 40 needs to operate, the first network entity 40 may be started by using the BIOS solidified in the ROM or a bootloader boot system in the embedded system, to guide the first network entity 40 into a normal operating state. After the first network entity 40 enters the normal operating state, the application program and the operating system in the RAM are run, to perform the processing process of the first network entity in the method embodiment.

It can be understood that FIG. 4 shows only a simplified design of the first network entity 40. In actual application, the first network entity may include any quantity of interfaces, processors, or memories.

Figure 5:
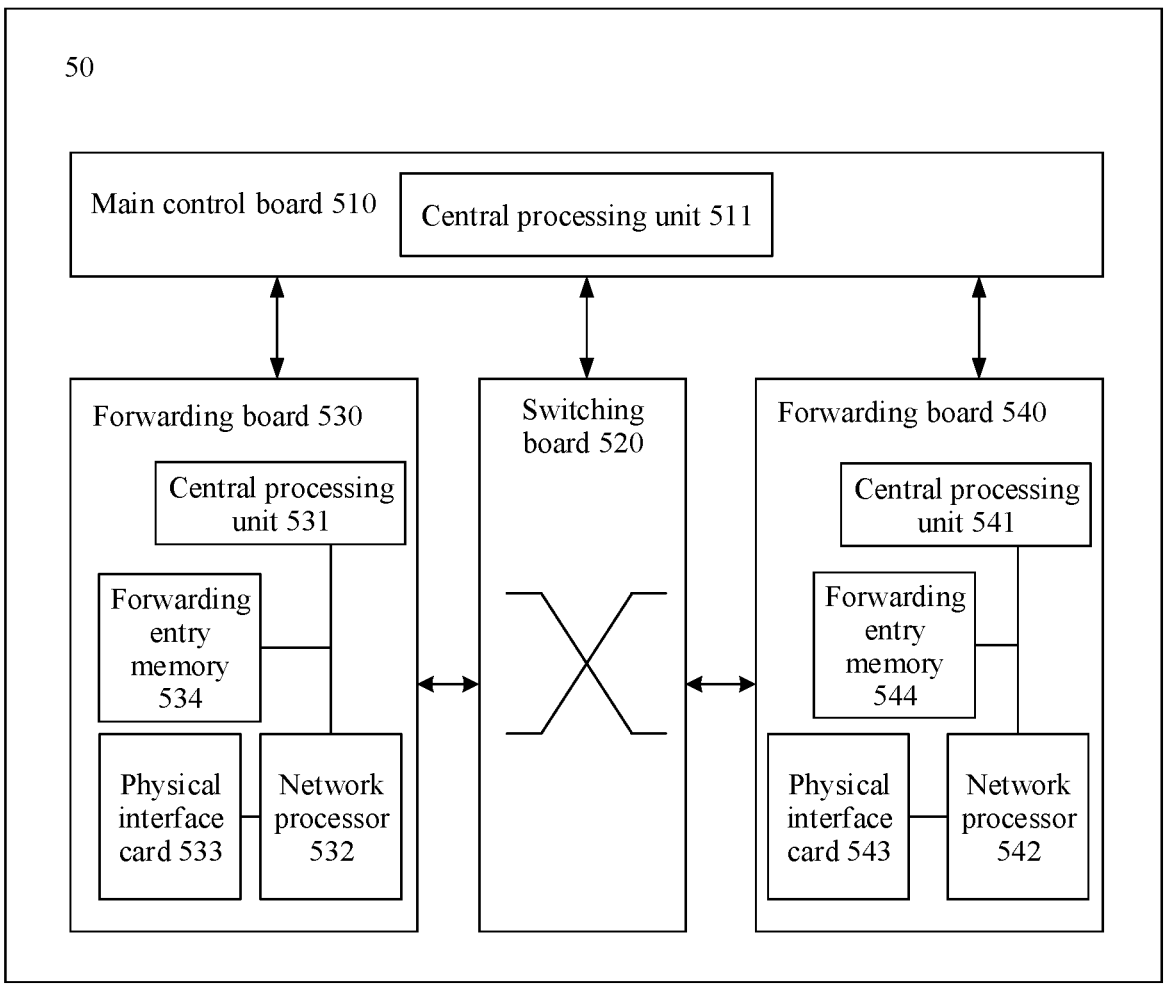
FIG. 5 is a schematic diagram of a first network entity for performing detection on an ACL rule according to this application.

FIG. 5 is a schematic diagram of a hardware structure of another first network entity 50 according to an embodiment of this application. The first network entity 50 shown in FIG. 5 may perform corresponding operations performed by the first network entity in the foregoing method embodiment.

As shown in FIG. 5, the first network entity 50 includes a main control board 510, a forwarding board 530, a switching board 520, and a forwarding board 540. The main control board 510, the forwarding boards 530 and 540, and the switching board 520 are connected to a system backplane by using a system bus to implement interworking. The main control board 510 is configured to perform functions such as system management, device maintenance, and protocol processing. The switching board 520 is configured to exchange data between forwarding boards (a forwarding board is also referred to as a line card or a service board). The forwarding boards 530 and 540 are configured to provide various service interfaces (for example, a POS interface, a GE interface, and an ATM interface), and forward packets.

The forwarding board 530 may include a central processing unit 531, a forwarding entry memory 534, a physical interface card 533, and a network processor 532. The central processing unit 531 is configured to control and manage the forwarding boards and communicate with a central processing unit 511 on the main control board. The forwarding entry memory 534 is configured to store a forwarding entry. The physical interface card 533 is configured to send and receive traffic. The network processor 532 is configured to control, based on the forwarding entry, the physical interface card 533 to send and receive traffic.

In an embodiment, the forwarding board 530 may obtain a second ACL rule by using the physical interface card 533, and the forwarding board 530 may generate a second entry according to the second ACL rule by using the central processing unit 531. The central processing unit 531 of the forwarding board sends the second entry to the central processing unit 511 of the main control board 510. The central processing unit 511 of the main control board 510 determines whether second information is a subset of the first information.

If the central processing unit 511 determines that the second information is a subset of the first information, the central processing unit 511 determines that the second ACL rule is an invalid ACL rule, and the central processing unit 511 indicates, by using the central processing unit 531 of the forwarding board 530, the forwarding entry memory 534 not to send the second ACL rule to a second network entity.

It should be understood that, in this embodiment of this application, operations on the forwarding board 540 are the same as operations on the forwarding board 530. For brevity, details are not described again. It should be understood that the first network entity 50 in this embodiment of this application may correspond to functions and/or various operations implemented in the foregoing method embodiment. Details are not described herein again.

In addition, it should be noted that there may be one or more main control boards, and when there are a plurality of main control boards, the main control boards may include an active main control board and a standby main control board. There may be one or more forwarding boards. More forwarding boards are provided as the first network entity has a stronger data processing capability. There may also be one or more physical interface cards on the forwarding board. There may be no switching board, or there may be one or more switching boards. When there are a plurality of switching boards, the switching boards may jointly implement load sharing and redundancy backup. In a centralized forwarding architecture, the first network entity may not need a switching board, and the forwarding board is responsible for processing service data of an entire system. In a distributed forwarding architecture, the first network entity may have at least one switching board, and data is exchanged between a plurality of forwarding boards by using the switching board, to provide a large-capacity data exchange and processing capability. Therefore, a data access and processing capability of the first network entity in the distributed architecture is greater than that of a device in the centralized architecture. A specific architecture used depends on a specific networking and deployment scenario, and is not limited herein.

Figure 6:
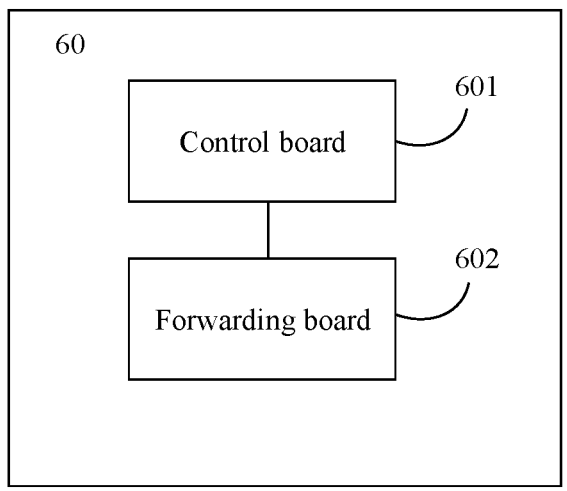
FIG. 6 is a schematic diagram of a first network entity for performing detection on an ACL rule according to this application.

FIG. 6 is a schematic diagram of a hardware structure of another first network entity 60 according to an embodiment of this application. The first network entity 60 shown in FIG. 6 may perform corresponding operations performed by the first network entity in the foregoing method embodiment.

In an embodiment, the first network entity may include a control board 601 and a forwarding board 602. The control board 601 may be configured to obtain a second access control list ACL rule. The first network entity includes a first entry. The first entry includes a first rule index and first information. The first rule index is used to indicate a first ACL rule. The first information is information extracted by the control board from the first ACL rule. The first ACL rule is a valid ACL rule.

The control board 601 may be further configured to generate a second entry according to the second ACL rule.

The second entry includes a second rule index and second information. The second rule index is used to indicate the second ACL rule. The second information is information extracted by the control board from the second ACL rule. The second information has a same attribute as that of the first information. The control board is further configured to determine whether the second information is a subset of the first information.

The control board 601 is further configured to: when it is determined that the second information is a subset of the first information, determine that the second ACL rule is an invalid ACL rule, and indicate the forwarding board 602 not to send the second ACL rule to a second network entity.

Figure 7:
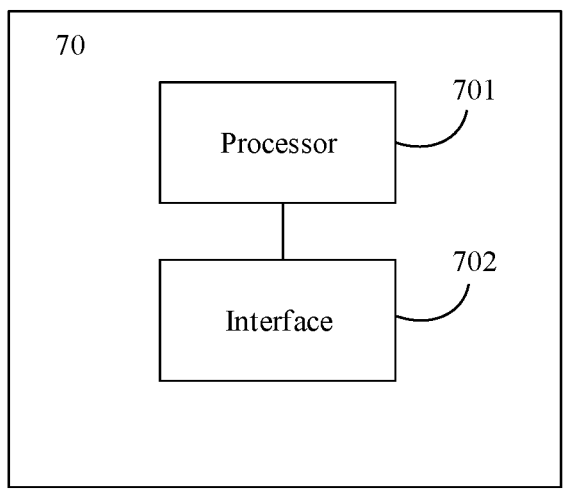
FIG. 7 is a schematic diagram of a first network entity for performing detection on an ACL rule according to this application.

FIG. 7 is a schematic diagram of a hardware structure of another first network entity 70 according to an embodiment of this application. The first network entity 70 shown in FIG. 7 may perform corresponding operations performed by the first network entity in the foregoing method embodiment.

In an embodiment, the first network entity may include a processor 701 and an interface 702. The processor 701 is configured to obtain a second access control list ACL rule. The first network entity includes a first entry. The first entry includes a first rule index and first information. The first rule index is used to indicate a first ACL rule. The first information is information extracted by the processor 701 from the first ACL rule. The first ACL rule is a valid ACL rule.

The processor 701 is further configured to generate a second entry according to the second ACL rule. The second entry includes a second rule index and second information. The second rule index is used to indicate the second ACL rule. The second information is information extracted by the processor 701 from the second ACL rule. The second information has a same attribute as that of the first information.

The processor 701 is further configured to determine whether the second information is a subset of the first information. The processor is further configured to: when it is determined that the second information is a subset of the first information, determine that the second ACL rule is an invalid ACL rule, and indicate the interface 702 not to send the second ACL rule to a second network entity.

In another aspect, an embodiment of this application provides a computer storage medium, configured to store computer software instructions used by the first network device. The computer storage medium contains a program designed for executing the foregoing aspects.

Method or algorithm operations described in combination with the content disclosed in this application may be implemented by hardware, or may be implemented by a processor by executing a software instruction. The software instruction may be formed by a corresponding software module. The software module may be located in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware or software. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing specific implementations further describe the objectives, the technical solutions, and the beneficial effects of this application in detail. It should be understood that the foregoing descriptions are merely specific implementations of this application.

What is claimed is:

1. A method for performing detection on an access control list (ACL) rule, comprising:
    obtaining, by a first network entity, a second ACL rule, wherein the first network entity maintains a first entry having a first rule index and first information, wherein the first rule index is used to indicate a first ACL rule as a valid ACL rule, the first information is information extracted by the first network entity from the first ACL rule;
    generating, by the first network entity, a second entry according to the second ACL rule, wherein the second entry comprises a second rule index and second information, the second rule index is used to indicate the second ACL rule, the second information is information extracted by the first network entity from the second ACL rule, and the second information has a same attribute as that of the first information;
    determining, by the first network entity, whether the second information is a subset of the first information; and
    in response to determining that the second information is a subset of the first information, determining, by the first network entity, that the second ACL rule is an invalid ACL rule, and skipping, by the first network entity, sending the second ACL rule to a second network entity.

2. The method according to claim 1, further comprising:
    in response to determining that the second information is not a subset of the first information, determining, by the first network entity, that the second ACL rule is a valid ACL rule, and sending, by the first network entity, the second ACL rule to the second network entity.

3. The method according to claim 1, wherein the first network entity comprises an ACL rule element table including the first entry and the second entry, and in response to determining that the second ACL rule is an invalid ACL rule, the method further comprises:
    generating, by the first network entity, a user report based on the ACL rule element table, wherein the user report comprises the first ACL rule, the second ACL rule, and a parent-child relationship between the first ACL rule and the second ACL rule, and the first ACL rule is a parent rule of the second ACL rule.

4. The method according to claim 2, further comprising:
    determining, by the first network entity, that a third ACL rule is an ACL rule to be detected, wherein a third entry comprises a third rule index and third information, the third information is extracted by the first network entity from the third ACL rule, the third rule index is used to indicate the third ACL rule as a valid ACL rule;

determining, by the first network entity, whether a fourth entry is included after the third entry in the ACL rule element table, wherein the fourth entry comprises a fourth rule index and fourth information, the fourth rule index indicates a fourth ACL rule, and the fourth information is a subset of the third information; and in response to determining that the fourth entry is not included after the third entry in the ACL rule element table, instructing, by the first network entity, the second network entity to delete the third ACL rule.

5. The method according to claim 4, further comprising:
in response to determining that the fourth entry is included after the third entry in the ACL rule element table, determining, by the first network entity, whether a fifth entry exists between the third entry and the fourth entry in the ACL rule element table, wherein the fifth entry comprises a fifth rule index and fifth information, the fifth rule index indicates a fifth ACL rule, and the fourth information is a subset of the fifth information;

in response to determining that the fifth entry does not exist between the third entry and the fourth entry in the ACL rule element table, sending, by the first network entity, the fourth ACL rule to the second network entity; and instructing, by the first network entity, the second network entity to delete the third ACL rule.

6. The method according to claim 5, further comprising:
in response to determining that the fifth entry exists between the third entry and the fourth entry in the ACL rule element table, instructing, by the first network entity, the second network entity to delete the third ACL rule.

7. A first network entity for performing detection on an access control list (ACL) rule, comprising:
a non-transitory memory storing instructions; and
a processor coupled to the non-transitory memory, wherein the instructions, when executed by the processor, cause the first network entity to:
obtain a second ACL rule, wherein the first network entity maintains a first entry comprising a first rule index and first information, the first rule index is used to indicate a first ACL rule as a valid ACL rule, the first information is information extracted by the first network entity from the first ACL rule;
generate a second entry according to the second ACL rule, wherein the second entry comprises a second rule index and second information, the second rule index is used to indicate the second ACL rule, the second information is information extracted by the first network entity from the second ACL rule, and the second information has a same attribute as that of the first information; and
determine whether the second information is a subset of the first information, wherein when the second information is a subset of the first information, determine that the second ACL rule is an invalid ACL rule, and skip sending the second ACL rule to a second network entity.

8. The first network entity according to claim 7, wherein the instructions, when executed by the processor, further cause the first network entity to be configured to:
when the second information is not a subset of the first information, determine that the second ACL rule is a valid ACL rule; and
send the second ACL rule to the second network entity.

9. The first network entity according to claim 7, wherein the first network entity comprises an ACL rule element table, and the ACL rule element table comprises the first entry and the second entry; and the instructions, when executed by the processor, further cause the first network entity to be configured to:
generate a user report based on the ACL rule element table, wherein the user report comprises the first ACL rule, the second ACL rule, and a parent-child relationship between the first ACL rule and the second ACL rule, and the first ACL rule is a parent rule of the second ACL rule.

10. The first network entity according to claim 8, wherein the instructions, when executed by the processor, further cause the first network entity to be configured to:
determine that a third ACL rule is an ACL rule to be detected, wherein a third entry comprises a third rule index and third information, the third information is extracted by the first network entity from the third ACL rule, the third rule index is used to indicate the third ACL rule as a valid ACL rule;
determine whether a fourth entry is included after the third entry in the ACL rule element table, wherein the fourth entry comprises a fourth rule index and fourth information, the fourth rule index indicates a fourth ACL rule, and the fourth information is a subset of the third information; and
when the first network entity determines that the fourth entry is not included after the third entry in the ACL rule element table, instruct the second network entity to delete the third ACL rule.

11. The first network entity according to claim 10, wherein the instructions, when executed by the processor, further cause the first network entity to be configured to:
when the fourth entry is included after the third entry, determine whether a fifth entry exists between the third entry and the fourth entry in the ACL rule element table, wherein the fifth entry comprises a fifth rule index and fifth information, the fifth rule index indicates a fifth ACL rule, and the fourth information is a subset of the fifth information;
when the fifth entry does not exist between the third entry and the fourth entry in the ACL rule element table, send the fourth ACL rule to the second network entity; and
instruct the second network entity to delete the third ACL rule.

12. The first network entity according to claim 11, wherein the instructions, when executed by the processor, further cause the first network entity to be configured to:
when the fifth entry exists between the third entry and the fourth entry in the ACL rule element table, instruct the second network entity to delete the third ACL rule.

13. A non-transitory computer readable medium having instruction stored therein, which when executed by a processor, cause a first network entity to perform operations of detecting on an access control list (ACL) rule, the operations comprising:
obtaining a second ACL rule, wherein the first network entity maintains a first entry having a first rule index and first information, wherein the first rule index is used to indicate a first ACL rule as a valid ACL rule, the first information is information extracted by the first network entity from the first ACL rule;
generating a second entry according to the second ACL rule, wherein the second entry comprises a second rule index and second information, the second rule index is used to indicate the second ACL rule, the second information is information extracted by the first network entity from the second ACL rule, and the second information has a same attribute as that of the first information;

determining whether the second information is a subset of the first information; and in response to determining that the second information is a subset of the first information, determining that the second ACL rule is an invalid ACL rule, and skipping, by the first network entity, sending the second ACL rule to a second network entity.

14. The computer readable medium according to claim 13, wherein the operations further comprise:

in response to determining that the second information is not a subset of the first information, determining that the second ACL rule is a valid ACL rule, and sending, by the first network entity, the second ACL rule to the second network entity.

15. The computer readable medium according to claim 13, wherein the first network entity comprises an ACL rule element table including the first entry and the second entry, and in response to determining that the second ACL rule is an invalid ACL rule, the operations further comprise:

Generating a user report based on the ACL rule element table, wherein the user report comprises the first ACL rule, the second ACL rule, and a parent-child relationship between the first ACL rule and the second ACL rule, and the first ACL rule is a parent rule of the second ACL rule.

16. The computer readable medium according to claim 14, wherein the operations further comprise:

determining that a third ACL rule is an ACL rule to be detected, wherein a third entry comprises a third rule index and third information, the third information is extracted by the first network entity from the third ACL rule, the third rule index is used to indicate the third ACL rule as a valid ACL rule;

determining whether a fourth entry is included after the third entry in the ACL rule element table, wherein the fourth entry comprises a fourth rule index and fourth information, the fourth rule index indicates a fourth ACL rule, and the fourth information is a subset of the third information; and in response to determining that the fourth entry is not included after the third entry in the ACL rule element table, instructing the second network entity to delete the third ACL rule.

17. The computer readable medium according to claim 16, wherein the operations further comprise:

in response to determining that the fourth entry is included after the third entry in the ACL rule element table, determining whether a fifth entry exists between the third entry and the fourth entry in the ACL rule element table, wherein the fifth entry comprises a fifth rule index and fifth information, the fifth rule index indicates a fifth ACL rule, and the fourth information is a subset of the fifth information;

in response to determining that the fifth entry does not exist between the third entry and the fourth entry in the ACL rule element table, sending the fourth ACL rule to the second network entity; and instructing the second network entity to delete the third ACL rule.

18. The computer readable medium according to claim 17, wherein the operations further comprise:

in response to determining that the fifth entry exists between the third entry and the fourth entry in the ACL rule element table, instructing the second network entity to delete the third ACL rule.

* * * * *